March 9, 1954     H. J. HAWKINS     2,671,355
HOLDING DEVICE
Filed April 19, 1951
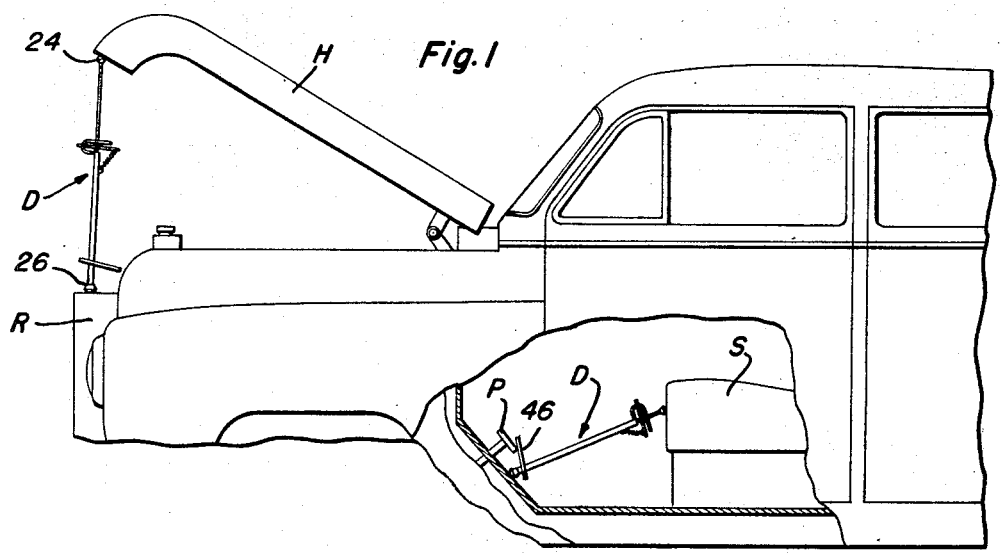
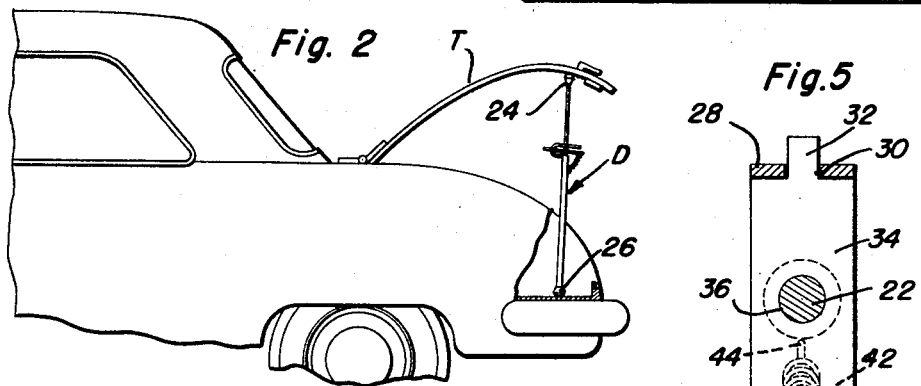
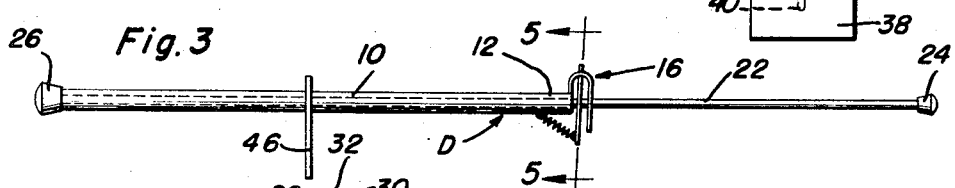
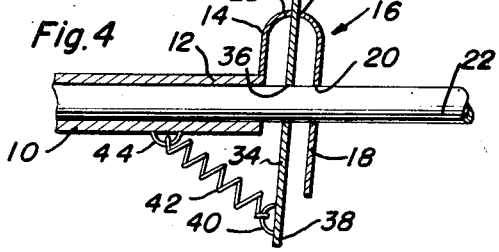
Hjalmer J. Hawkins
INVENTOR.

Patented Mar. 9, 1954

2,671,355

UNITED STATES PATENT OFFICE 2,671,355

HOLDING DEVICE

Hjalmer J. Hawkins, Chisago City, Minn.

Application April 19, 1951, Serial No. 221,855

1 Claim. (Cl. 74—532)

This invention relates to new and useful improvements in vehicle accessories and a primary object of the present invention is to provide a device for retaining a vehicle hood raised, a vehicle trunk raised, or for retaining the brake pedal of a vehicle depressed.

Another important object of the present invention is to provide a longitudinally adjustable holding device composed of two telescoped members and a novel and improved means for locking the members in relative longitudinal adjustment.

A further object of the present invention is to provide a holding device including a tubular member that slidably receives a rod together with a spring urged locking dog engaging the rod to retain the rod adjusted longitudinally with respect to the member in order that the device may be manually adjusted in order to retain a vehicle hood or trunk raised a predetermined amount.

A still further aim of the present invention is to provide a holding device of the aforementioned character that is simple and practical in construction, strong and reliable in use, neat and attractive in appearance, inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view of a vehicle and showing the present invention in use for retaining the vehicle hood raised, and the brake pedal depressed;

Figure 2 is a fragmentary side elevational view of a vehicle and showing the trunk thereof held in its raised position by the present holding device;

Figure 3 is a plan view of the present invention;

Figure 4 is an enlarged fragmentary detailed sectional view showing the particular locking means embodied in the present invention; and Figure 5 is an enlarged detail sectional view taken substantially on the plane of section line 5—5 of Figure 3.

Referring now to the drawings in detail, wherein for the purpose of illustration, there is disclosed a preferred embodiment of the present invention, the letter D represents the present holding device generally, including an elongated tubular member 10 whose inner end portion 12 is suitably fixed to the inner leg portion 14 of a U-shaped guide 16 to secure the guide laterally of the member 10. The outer leg portion 18 of the guide 16 is formed with an opening 20 that registers with the axial bore of the member 10.

A rod 22 is slidably received in the member 10, through the opening 20, and the outer end of the rod 22 carries a removable, resilient cap 24. The outer end of the member 10 also carries a removable, resilient cap 26.

The web portion 28 of the U-shaped guide 16 is formed with a multi-sided hole 30 that swingably receives the small, reduced multi-sided end 32 of a locking plate 34 to permit swinging movement of the plate between the leg portions 14 and 18 of the guide. The locking plate is formed with an opening 36 that slidably receives the rod 22 when the plate is disposed at a predetermined angle relative to the rod.

One end 38 of the plate 34 projects outwardly from the guide and supports an anchoring eye 40 to which one end of a coil spring 42 is attached. The other end of the spring 42 is secured to an anchoring eye 44 on the member 10 to urge the plate 34 to a position whereby the edges defining the opening 36 will bind against the outer periphery of the rod 22 and thus retain the rod 22 adjusted longitudinally with respect to the tubular member 10. As the outer end 38, which constitutes a finger grip, is pulled away from the inner end portion 12 of the member 10, the edges defining the opening 36 will no longer bind against the outer periphery of the rod 22 and the rod 22 may be longitudinally adjusted in a convenient manner.

In practical use of the present invention, the same may be placed with the cap 26 resting upon a vehicle radiator R and with the device adjusted sufficiently, permit the cap 24 to engage the forward end of the vehicle hood H. In this position, as shown in Figure 1, the device is employed for retaining the hood in its raised position. The device may also be employed for retaining the trunk door T of a vehicle raised, as shown in Figure 2, with the cap 26 bearing against the floor of the trunk compartment and with the cap 24 bearing against the trunk door T.

Figure 1 also illustrates the holding device in use for retaining the foot pedal P of the vehicle brake system depressed whereby the braking fluid of the vehicle may be removed from its pipe system. When the device is used in this capacity, a plate member 46 is slidably received upon the tubular member 10. The plate 46 is provided with an opening of such a size as to accommodate the tubular member 10 and the edges defining the opening in the plate member 46 will bind against the periphery of the tubular member 10 when the plate member 46 is forced to an inclined position relative to the member 10 as shown in Figure 1. The cap 24 is placed against the front vehicle seat F and the cap 26 engages the floor board of the vehicle with the plate member 46 resting against the pedal T.

Obviously, the instant adjustable holding device may be employed for various other purposes other than the three specific instances illustrated.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claim.

Having described the invention, what is claimed as new is:

In combination, a vehicle brake pedal holder comprising: an extensible rod adapted to bridge the space between the toeboard and the operator's seat of a motor vehicle at a point adjacent the brake pedal, said rod including telescopically adjustable male and female sections, means for releasably securing said sections in extended position, resilient caps on the ends of the rod engageable with the toeboard and the seat for frictionally securing said rod in position therebetween, and a substantially right angularly extending plate member mounted for sliding adjustment on the female section and engageable with the brake pedal for releasably securing same in depressed position.

HJALMER J. HAWKINS.

References Cited in the file of this patent

UNITED STATES PATENTS

| Number | Name | Date |
|---|---|---|
| 1,263,955 | Stansbury | Apr. 23, 1918 |
| 1,596,834 | Herbert et al. | Aug. 17, 1926 |
| 1,615,798 | Cowdrey | Jan. 25, 1927 |
| 1,639,551 | Booth | Aug. 16, 1927 |
| 1,681,192 | McBride | Aug. 21, 1928 |
| 1,790,851 | Weaver | Feb. 3, 1931 |
| 2,051,969 | Shastock | Aug. 25, 1936 |
| 2,434,598 | Stegoll | Jan. 13, 1948 |
| 2,553,448 | Frauen | May 15, 1951 |
| 2,599,376 | Ehrenberg | June 3, 1952 |